United States Patent [19]

Saegusa et al.

[11] Patent Number: 5,155,759

[45] Date of Patent: Oct. 13, 1992

[54] CONTROL METHOD FOR CORDLESS TELEPHONE WHICH DISPLAYS IDENTITIES OF RESPONDING CALLED PARTIES

[75] Inventors: Noboru Saegusa; Toshihiro Hara, both of Tokyo; Hideki Toyama, Kanagawa; Yuji Ohta, Osaka; Shoji Fuse; Koji Ono, both of Tokyo, all of Japan

[73] Assignees: NEC Corporation; Nippon Telegraph and Telephone Corporation, both of Tokyo; K.K. Toshiba, Kanagawa, all of Japan

[21] Appl. No.: 701,314

[22] Filed: May 17, 1991

Related U.S. Application Data

[63] Continuation of Ser. No. 380,360, Jul. 17, 1989, abandoned.

[30] Foreign Application Priority Data

Jul. 15, 1988 [JP] Japan .................................. 63-175211

[51] Int. Cl.$^5$ ............................................ H04M 11/00
[52] U.S. Cl. ......................................... 379/61; 379/142; 379/205; 379/247; 379/396
[58] Field of Search .................... 379/57, 58, 61-63, 379/53, 54, 94, 202-206, 158, 216, 396, 354, 142, 127, 245, 246, 247

[56] References Cited

U.S. PATENT DOCUMENTS

| | | | |
|---|---|---|---|
| 4,540,850 | 9/1985 | Herr et al. | 379/94 |
| 4,653,090 | 3/1987 | Hayden | 379/396 |
| 4,741,019 | 4/1988 | Takahashi | 379/61 |
| 4,768,220 | 8/1988 | Yoshihara et al. | 379/63 |
| 4,771,448 | 9/1988 | Koohgoli et al. | 379/63 |
| 4,796,293 | 1/1989 | Blinken et al. | 379/202 |
| 4,805,203 | 2/1989 | Oda | 379/61 |
| 4,805,205 | 2/1989 | Faye | 379/142 |
| 4,856,047 | 8/1989 | Saunders | 379/57 |

FOREIGN PATENT DOCUMENTS 0209261  8/1988  Japan .................................. 379/142

Primary Examiner—James L. Dwyer
Assistant Examiner—Dwayne D. Bost
Attorney, Agent, or Firm—Sughrue, Mion, Zinn Macpeak & Seas

[57] ABSTRACT

A control method for a cordless telephone system including a main apparatus connected to a telephone line and having a line control function, a plurality of stationary apparatuses connected to the main apparatus and each having a radio transmitter/receiver, and portable telephones capable of communicating with the stationary apparatuses through a radio channel. When the main apparatus receives a simultaneous calling request signal from one portable telephone through a given stationary apparatus, it transmits a simultaneous calling request signal to whichever of the other portable telephones are not in use through corresponding stationary apparatuses. The main apparatus then receives, from that responding portable telephone through the corresponding stationary apparatus, an incoming call response signal including an extension number of the responding portable telephone which received the simultaneous calling request signal, and transmits a response display signal including that extension number to the portable telephone which requested simultaneous calling. The portable telephone which requested simultaneous calling displays the extension number of the responding portable telephone.

4 Claims, 3 Drawing Sheets

CONTROL METHOD FOR CORDLESS TELEPHONE WHICH DISPLAYS IDENTITIES OF RESPONDING CALLED PARTIES

This is a continuation of application Ser. No. 07/380,360 filed Jul. 17, 1989, now abandoned.

BACKGROUND OF THE INVENTION

The present invention relates to a control method for a cordless telephone system for connecting a plurality of stationary apparatuses and a plurality of movable portable telephones through radio channels and, more particularly, to an extension call among the portable telephones.

FIG. 1 shows an arrangement of a cordless telephone system. In FIG. 1, reference numeral 1 denotes a main apparatus connected to a plurality of telephone lines and having a line connection function; $10_1$ to $10_n$, stationary apparatuses each having a radio transmitter/receiver; $20_1$ to $20_m$, portable telephones; and $30_1$ to $30_n$, radio zones within which the portable telephones $20_1$ to $20_m$ can perform communication.

The radio zones $30_1$ to $30_n$ respectively correspond to the stationary apparatuses $10_1$ to $10_n$. The portable telephones $20_1$ to $20_m$ can be connected to a corresponding one of the stationary apparatuses from anywhere within the assigned radio zones $30_1$ to $30_n$, and can perform an office line outgoing/incoming call, an extension outgoing/incoming call, and the like.

In the cordless telephone system with the above arrangement, however, although one portable telephone can call all other portable telephones, the calling portable telephone cannot detect whether or not other portable telephones perform an incoming call display. This will be exemplified below.

FIG. 2 shows a conventional control method of a cordless telephone. In this case, connection procedures of simultaneous calling are illustrated, i.e., when a caller in just a single calling operation calls multiple destinations. For the sake of simplicity, the system is assumed to be constituted by a main apparatus, first to third stationary apparatuses, and first to third portable telephones. Assume that the first to third telephones belong to radio zones of the first to third stationary apparatuses, respectively. Furthermore, the second portable telephone is connected to the second stationary apparatus through a radio channel and is busy through an office line.

In FIG. 2, the first portable telephone sends a call request signal $S_{21}$ to the first stationary apparatus in response to a simultaneous calling operation by a user. Upon reception of the call request signal $S_{21}$, the first stationary apparatus transmits a call request signal $S_{22}$ to the main apparatus. When the main apparatus receives the call request signal $S_{22}$, it transmits an incoming call signal $S_{23}$ to the third stationary apparatus which is not in use (the second stationary apparatus is in use). Upon reception of the incoming call signal $S_{23}$, the third stationary apparatus transmits an incoming call signal $S_{24}$ to the third portable telephone. The third portable telephone performs an incoming call display upon reception of the incoming call signal $S_{24}$, and informs a user of the third portable telephone of simultaneous calling.

However, although the first portable telephone performs simultaneous calling to the second and third portable telephones, the second portable telephone (not shown) is busy through an office line, and only the third portable telephone performs an incoming call display. Meanwhile, the first portable telephone cannot detect whether or not other portable telephones perform the incoming call display. Thus, a user of the first portable telephone makes a wrong judgement that the second portable telephone performs the incoming call display.

SUMMARY OF THE INVENTION

It is therefore a principal object of the present invention to provide a control method for a cordless telephone system, in which a response signal including an extension number is transmitted to a portable telephone requesting simultaneous calling, so that extension numbers of portable telephones which respond to simultaneous calling can be detected.

In order to achieve the above object, according to an aspect of the present invention, there is provided a control method for a cordless telephone system which comprises: a main apparatus connected to a telephone line and having a line control function; a plurality of stationary apparatuses connected to the main apparatus and each having a radio transmitter/receiver; and portable telephones capable of communicating with the stationary apparatuses through a radio channel, wherein when the main apparatus receives a simultaneous calling request signal from one portable telephone through a given stationary apparatus, the main apparatus transmits a simultaneous calling request signal to the other portable telephone which is not in use on the basis of the received simultaneous calling request signal through a corresponding stationary apparatus, and receives, from the other portable telephone through the corresponding stationary apparatus, a response signal including an extension number of the other portable telephone which received the simultaneous calling request signal, and transmits a response signal including the extension number of the other portable telephone which responded to simultaneous calling to the one portable telephone which requested simultaneous calling through the given stationary apparatus, and the one portable telephone which requested simultaneous calling displays the extension number of the other portable telephone which responded to the simultaneous calling.

DESCRIPTION OF THE PREFERRED EMBODIMENT

Figure 1:
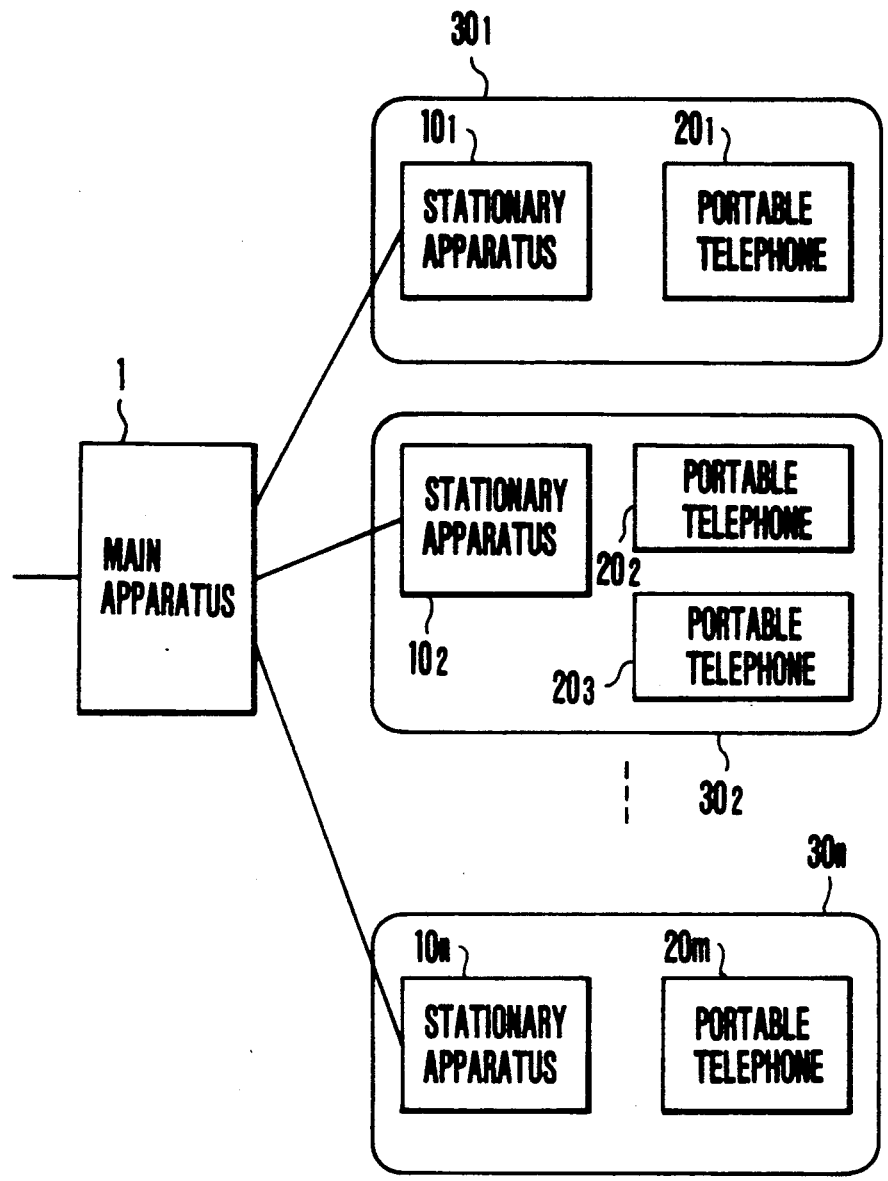
FIG. 1 is a block diagram showing an arrangement of a cordless telephone system.
Figure 2:
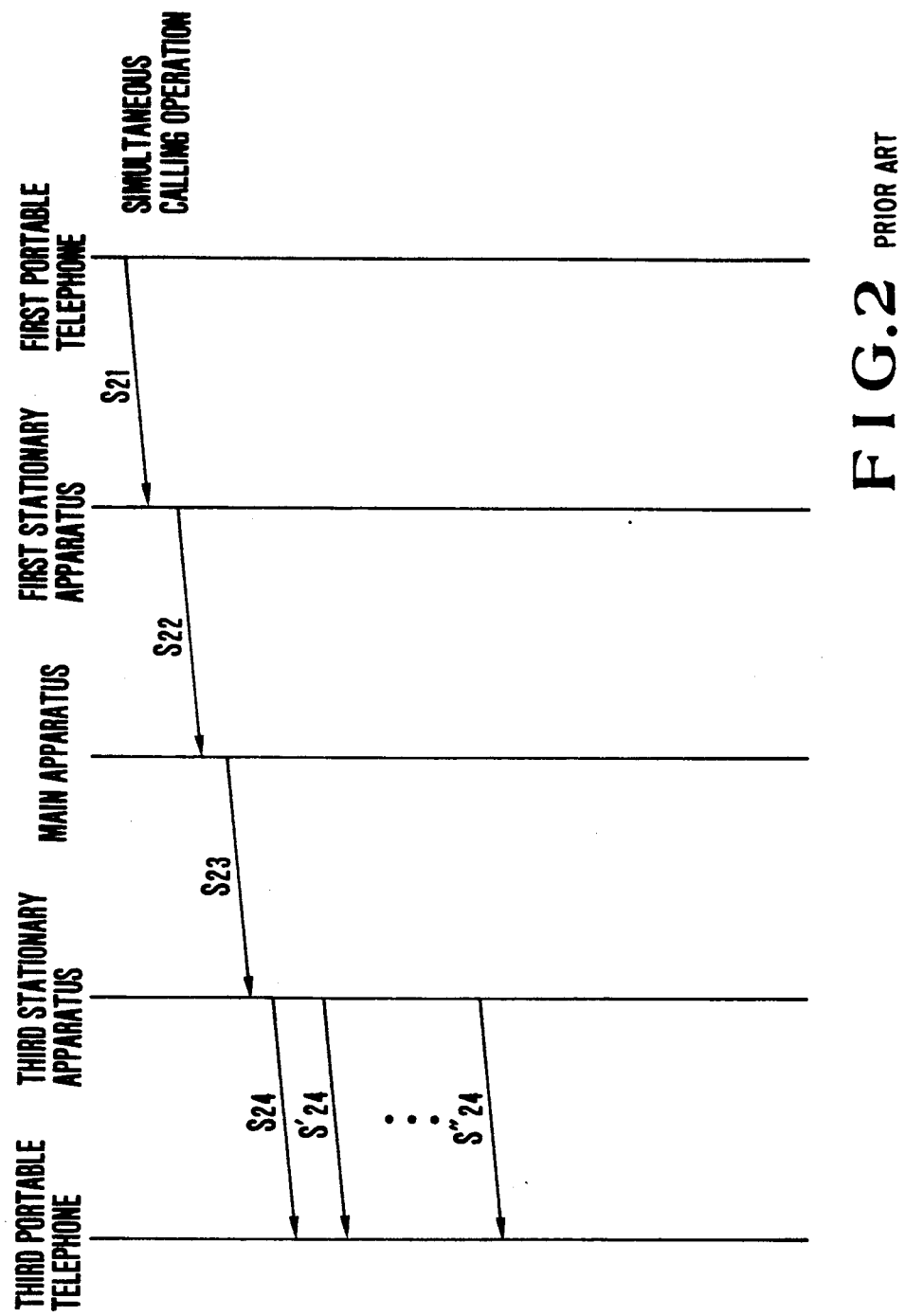
FIG. 2 is a chart showing a conventional control method for a cordless telephone system.
Figure 3:
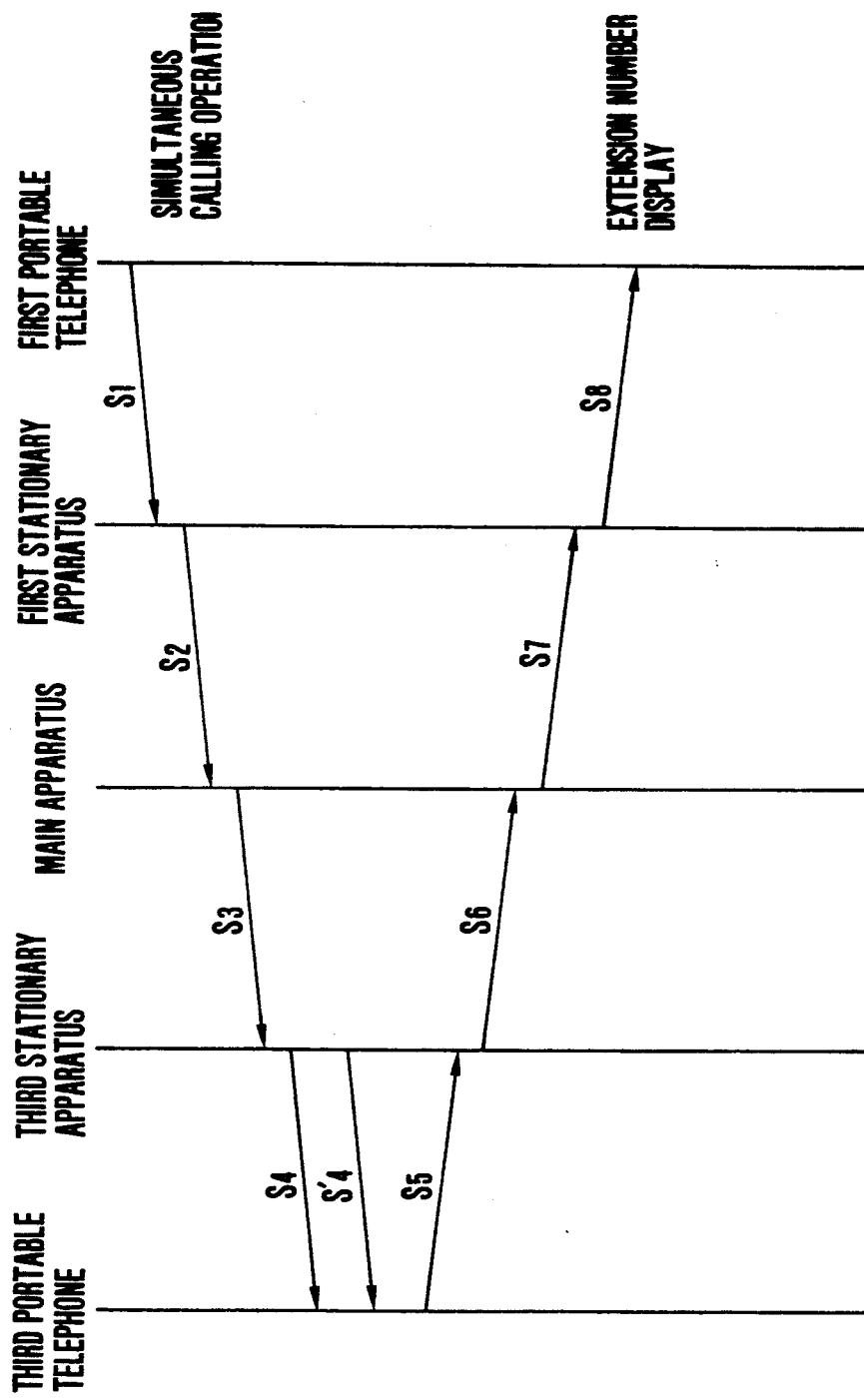
FIG. 3 is a chart showing a control method for a cordless telephone system according to the present invention.

FIG. 3 shows a control method of a cordless telephone system according to the present invention. For the sake of simplicity, assume that this embodiment comprises first to third stationary apparatuses and first to third portable telephones, and that the first to third portable telephones belong to radio zones of the first to third stationary apparatuses, respectively. In addition, assume that the second portable telephone is connected to the second stationary apparatus through a radio channel and is busy through an office line.

In FIG. 3, the first portable telephone transmits a simultaneous calling request signal $S_1$ to the first stationary apparatus in response to a simultaneous calling operation by a user. The first stationary apparatus transmits a simultaneous calling request signal $S_2$ to the main apparatus upon reception of the simultaneous calling request signal $S_1$. When the main apparatus receives the simultaneous calling request signal $S_2$, it transmits an incoming call signal $S_3$ to the third stationary apparatus which is not in use (the second stationary apparatus is in use). Upon reception of the incoming call signal $S_3$, the third stationary apparatus transmits an incoming call signal $S_4$ to the third portable telephone which belongs to it. The third portable telephone performs an incoming call display upon reception of the incoming call signal $S_4$ to inform a user of the simultaneous calling. The third portable telephone transmits an incoming call response signal $S_5$ including its own extension number to the third stationary apparatus. Upon reception of the response signal $S_5$, the third stationary apparatus transmits an incoming call signal $S_6$ including the extension number of the portable telephone which responded to the simultaneous calling to the main apparatus.

When the main apparatus receives the incoming call response signal $S_6$, it transmits a response display signal $S_7$ including the extension number of the portable telephone which responded to the simultaneous calling to the first stationary apparatus which requested the simultaneous calling. Upon reception of the response display signal $S_7$, the first stationary apparatus transmits a response display signal $S_8$ including the extension number of the portable telephone which responded to the simultaneous calling to the first portable telephone. When the first portable telephone receives the response display signal $S_8$, it displays the extension number included in the input signal on a display unit. Thus, the user can know response of the third portable telephone and non-response of the second portable telephone.

If a large number of portable telephones are arranged, extension numbers may be displayed simultaneously, in units of zones, or in turn in accordance with the number of digits of the extension number.

According to the present invention, a portable telephone which is simultaneously called transmits a response signal including an extension number to a portable telephone, which requested simultaneous calling, through a stationary apparatus, the main apparatus, and another stationary apparatus, so that a user can know an extension number of a portable telephone which responded to simultaneous calling.

What is claimed is:

1. A control method for a cordless telephone system which comprises a main apparatus connected to a telephone line and having a line control function, a plurality of stationary apparatuses connected to said main apparatus and each having a radio transmitter/receiver and portable telephones capable of communicating with said stationary apparatuses through a radio channel, said method comprising the steps of:
   transmitting a simultaneous calling request signal from a first of said portable telephones through a first of said stationary apparatuses to said main apparatus,
   transmitting a simultaneous calling request signal from said main apparatus to a second of said portable telephones, which is not in use, through a second of said stationary apparatuses and to a third of said portable telephones, which is in use, through a third of said stationary apparatuses,
   transmitting from said second portable telephone to said main apparatus through said second stationary apparatus a response signal including an extension number of said second portable telephone,
   receiving said response signal at said main apparatus,
   transmitting said response signal from said main apparatus to said first portable telephone through the first stationary apparatus, and
   displaying at said first portable telephone the extension number of said second portable telephone in response to said response signal.

2. A method of operating a telephone system of the type having at least first, second and third telephones, with each telephone transmitting a call request signal to other telephones to request the establishment of a connection between said telephones, said method comprising the steps of:
   simultaneously transmitting a call request signal from said first telephone to said second and third telephones;
   receiving said call request signal at said second and third telephones and providing to operators of said second and third telephones indications at said second and third telephones of the receipt of said call request signal respectively;
   transmitting a call response signal from each of said second and third telephones to said first telephone in response to receipt of said call request signal at each of said second and third telephones said call response signals respectively including the identities of said second and third telephones;
   displaying at said first telephone the identities of said second and third telephones, in response to receipt at said first telephone of said call response signals, that said second and third telephones received said call request signal.

3. A method as defined in claim 2, wherein said first, second and third telephones are first, second and third portable telephones in a portable telephone system, said system further comprising, a main apparatus and stationary apparatuses associated with each of said first, second and third portable telephones, said call request signal comprising a simultaneous calling request signal transmitted from said first telephone to said main apparatus for transmission to each of said second and third portable telephones, said method comprising the steps of:
   monitoring the status of each of said second and third portable telephones at said main apparatus;
   in accordance with the monitored status of said second and third portable telephones, transmitting said simultaneous calling request signal from said main apparatus to said second portable telephone through said second stationary apparatus without transmitting said simultaneous calling request signal to said third portable telephone, and
   transmitting said call response signal from said second portable telephone to said first portable telephone without sending a call response signal from said third portable telephone to said first portable telephone, thereby indicating to a user of said first portable telephone that only said second portable telephone has received said simultaneous calling request signal.

4. A method as defined in claim 3, wherein said step of monitoring the status of each of said second and third portable telephones at the main apparatus includes the step of monitoring whether said second or third portable telephone is in use at the time said simultaneous calling request signal is transmitted by said first portable telephone.

* * * * *